United States Patent
Liu et al.

(10) Patent No.: US 6,909,551 B1
(45) Date of Patent: Jun. 21, 2005

(54) SIDE BY SIDE LASER LEVEL DEVICE

(75) Inventors: Hua Tang Liu, Taichung (TW); Zhi Hong Fang, Hang-Zhou (TW); Yue Ye Chen, Hang-Zhou (TW); Ye Chen, Hang-Zhou (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/838,348

(22) Filed: May 5, 2004

(30) Foreign Application Priority Data

Feb. 24, 2004 (TW) ........................... 93104690 A

(51) Int. Cl.⁷ ............................................... G02B 27/10
(52) U.S. Cl. .................... 359/618; 359/629; 359/738; 33/227
(58) Field of Search ................................ 359/618, 629, 359/630, 638–640, 738, 708; 33/227, 290, 291, 369

(56) References Cited

U.S. PATENT DOCUMENTS

| | | | |
|---|---|---|---|
| 3,771,876 A | 11/1973 | Ljungdahl et al. | 356/138 |
| 3,897,637 A | 8/1975 | Genho | 33/227 |
| 4,333,242 A | 6/1982 | Genho, Sr. | 33/227 |
| 4,852,265 A | 8/1989 | Rando et al. | 33/227 |
| 4,904,081 A | 2/1990 | Miyahara | 356/152 |
| 4,912,851 A | 4/1990 | Rando et al. | 33/227 |
| 6,163,969 A * | 12/2000 | Jan et al. | 33/282 |
| 6,177,987 B1 * | 1/2001 | Ting | 356/148 |
| 6,327,090 B1 * | 12/2001 | Rando et al. | 359/618 |

* cited by examiner

Primary Examiner—Huy Mai
(74) Attorney, Agent, or Firm—Troxell Law Office, PLLC

(57) ABSTRACT

A laser level includes a pair of level units arranged side by side and disposed in different oriented directions. Each laser level includes a laser light source adapted to emit a laser beam, a beam splitter adapted to simultaneously split the beam into first and second light beams along perpendicular first and second directions, and a first and a second aspheric-cylindrical lenses respectively arranged in the first and the second directions. The first and the second aspheric-cylindrical lenses have two optical axes respectively extending along the first and second directions.

23 Claims, 3 Drawing Sheets

«SIDE BY SIDE LASER LEVEL DEVICE»

BACKGROUND OF THE INVENTION

1. Field of the Invention

The present invention relates to a laser level, and particularly to a side by side laser level capable of level indication along multi directions in a circumferential area simultaneously.

2. Description of Related Art

In the construction industry, drawing or determining a distant horizontal or vertical line from a reference line is sometimes not easy to achieve in one step, especially for those desired lines located at different walls. Conventional methods for carrying out the line-drawing or line-determination operation can be performed by utilizing rulers, ink-string boxes, levelers, and so on as are well well-known in the art. However, these conventional methods may be tedious and difficult to achieve accurately, and may be subject to human error.

Subsequently, a variety of survey tools employing lasers have been developed to determine level horizontal or plumb vertical planes for construction, surveying, remodeling, etc. For example, U.S. Pat. Nos. 3,771,876, 3,897,637, 4,333, 242, 4,852,265, 4,904,081 and 4,912,851 illustrate various apparatuses utilizing laser technology for the construction industry. These and other similar devices utilize lasers to assist in leveling, aligning, plumbing or surveying operations.

U.S. Pat. No. 3,771,876 is directed to a laser apparatus for producing a plane or conical optical reference surface. The device includes a pendulum hanging from a flexible suspending member, with the pendulum containing the light source so as to be self-leveling. A prism device is used for reflecting the beam out of the device 90 degrees from the entry angle of the beam from the pendulum. The prism device is mounted on a vertical axle which can be caused to be rotate by a motor, whereby a conical reference surface is produced. However, the rotation of the prism device is easy to cause the laser apparatus to shake, thereby adversely affecting the accuracy of the laser apparatus. Further, since a motor is employed to drive the prism device to rotate, the volume of the laser apparatus is inevitably increased and the manufacturing cost is also increased.

In U.S. Pat. No. 3,897,637, there is disclosed a level tool utilizing a helium-neon laser for projecting a beam both vertically and horizontally. The device is not self-leveling and required manual leveling. It is rather large and required connection to an external source of power.

In some applications, when there is a need to provide level indication along various directions in a circumferential area, multi level indications are conducted time after time. Obviously, it is time-consuming.

Hence, an improved laser lever is required to overcome the disadvantages of the related art.

SUMMARY OF THE INVENTION

Accordingly, a first object of the present invention is to provide a laser level capable of level indication along multi directions in a circumferential area simultaneously.

A second object of the present invention is to provide a laser level having a simplified configuration and a low manufacturing cost.

In order to achieve the objects set forth, a laser level in accordance with the present invention comprises a pair of level units arranged side by side and disposed in different oriented directions. The pair of level units has substantially the same structure and each comprises a laser light source adapted to emit a laser beam, a beam splitter adapted to simultaneously split the laser beam into first and second light beams along perpendicular first and second directions, and a first and a second aspheric-cylindrical lenses respectively arranged in the first and the second directions. The first and the second aspheric-cylindrical lenses have two optical axes respectively extending along the first and the second directions. The first and the second light beams are respectively dispersed by the first and the second aspheric-cylindrical lenses to form an output beam having an angle approximately of 180 degrees.

According to one aspect of the present invention, each level unit further comprises a diverging lens disposed between the laser light source and the beam splitter for spreading the laser beam.

According to another aspect of the present invention, each level unit further comprises a light-limited element made of material than can prevent the light from penetrating therethrough. The light-limited element has two plates perpendicular to each other and defines two perpendicular windows respectively in the two plates for restricting the position and the width of the light beams along the first and the second directions.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
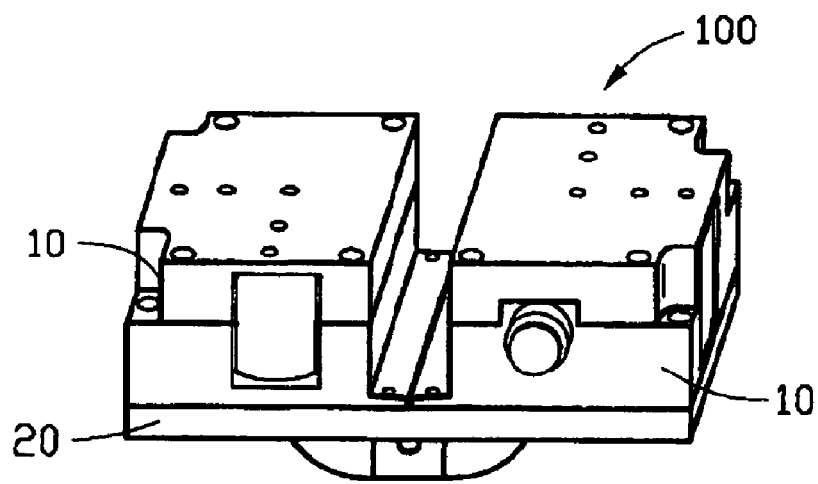
FIG. 1 is an assembled perspective view of a laser level in accordance with the present invention.

Referring to FIG. 1, a laser level 100 in accordance with the present invention comprises a mounting base 20 and a pair of level units 10 disposed on a mounting surface of the mounting base 20 in different orientated directions. The mounting base 20 has a bubble level (not shown) for providing a reference horizontal plane of the laser level 100. Since the bubble level is well known in the art, the detailed description of this is omitted here.

The pair of level units 10 has the same structure and the same working principle. For simplicity, only one level unit 10 is detailedly described below.

Figure 2:
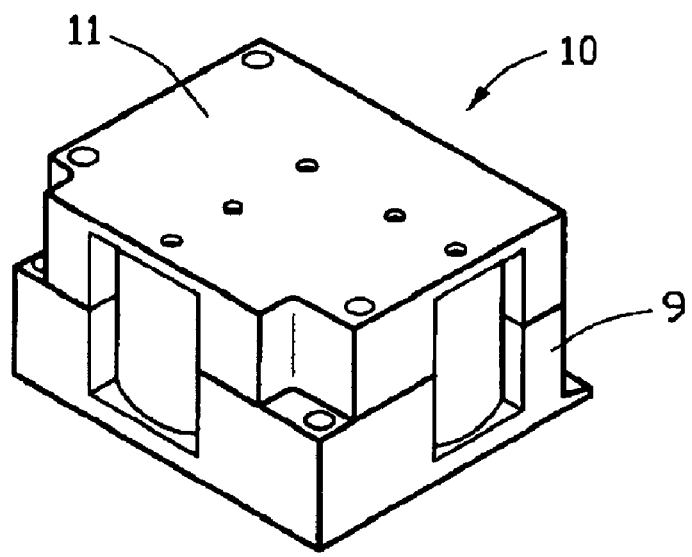
FIG. 2 is a perspective view of one of level units shown in FIG. 1.
Figure 3:
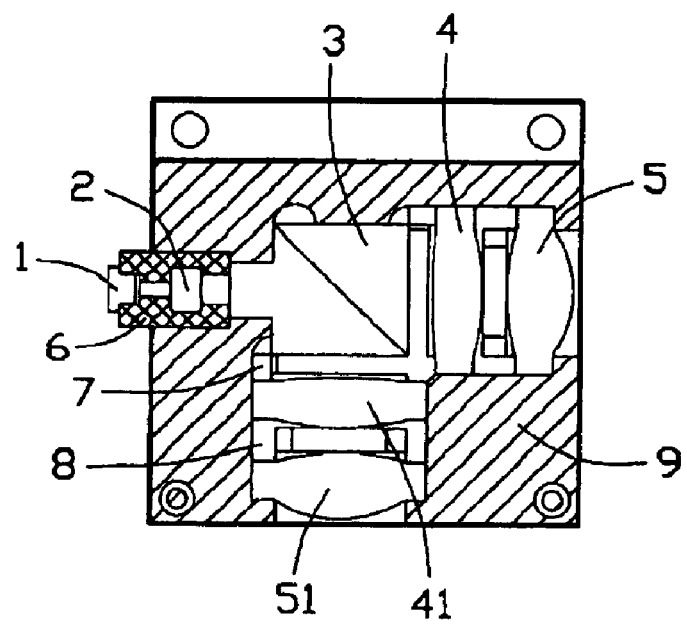
FIG. 3 is a cross-sectional view of the level unit shown in FIG. 2.

Referring to FIGS. 2 and 3, the level unit 10 comprises an upper cover 11, a lower cover 9 and an optical system disposed between the upper cover 11 and the lower cover 9. The optical system comprises a laser diode module 1 as a light source, a diverging lens 2, a beam splitter 3, a first and a second collimating lenses 4, 41, a first and a second aspheric-cylindrical lenses 5, 51, a barrel 6, a light-limited element 7 and a plurality of partitions 8. The beam splitter 3 is a prism adapted to split the laser beam emitted from the laser diode module 1 into two simultaneous light beams along perpendicular first and second directions. In addition, the beam splitter 3 may be replaced by a glass coated with a filter. The laser diode module 1, the diverging lens 2, the beam splitter 3, the first collimating lens 4 and the first aspheric-cylindrical lens 5 are arranged in the first direction. The optical axes of the laser diode module 1, the diverging lens 2, the beam splitter 3, the first collimating lens 4 and the first aspheric-cylindrical lens 5 extends in the first direction. At the same time, the optical axes of the second collimating lens 41 and the second aspheric-cylindrical lens 51 extends in the second direction. In other words, the optical axes of the first collimating lens 4 and the first aspheric-cylindrical lens 5 is perpendicular to the optical axes of the second collimating lens 41 and the second aspheric-cylindrical lens 51.

Figure 4:
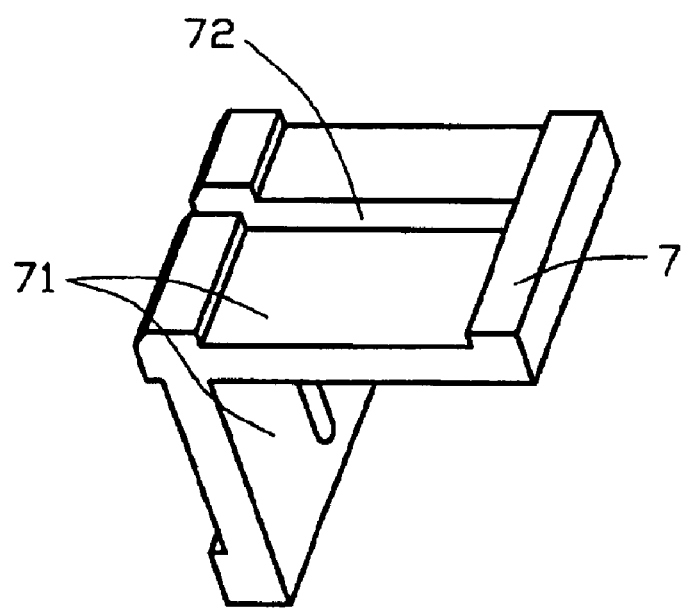
FIG. 4 is a perspective view of a light-limited element used in the level unit.

The barrel 6 is provided to fixedly receive the laser diode module 1 and the diverging lens 2. Then, the barrel 6 together with the laser diode module 1 and the diverging lens 2 is placed in the lower cover 9 of the level unit 10. The light-limited element 7 is disposed between the beam splitter 3 and the first and the second collimating lenses 4, 41. Referring to FIG. 4, the light-limited element 7 is made of special material that can prevent the light from penetrating therethrough. The light-limited element 7 has two plates 71 perpendicular to each other and defines two perpendicular windows 72 respectively in the two plates 71 for restricting the position and the width of the light beams along the first and the second directions. The two windows 72 may communicate with each other or not.

The partitions 8 are used to fix the first and the second collimating lenses 4, 41, and the first and the second aspheric-cylindrical lenses 5, 51 in the lower cover 9.

Figure 5:
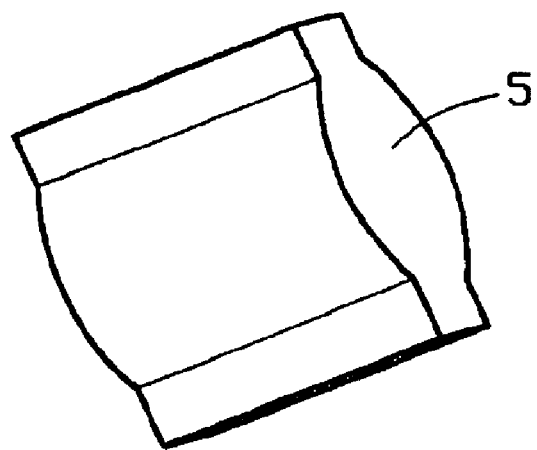
FIG. 5 is a perspective view of a column-shaped and non-spherical lens used in the level unit.

FIG. 5 illustrates the structure of the aspheric-cylindrical lens. Each of the first and the second aspheric-cylindrical lenses 5, 51 is effective to disperse the horizontal band-shaped light beam transmitted from the first or the second collimating lenses 4, 41 to a horizontal sector-shaped light beam having an angle greater than 90 degrees.

It is understood that each level unit 10 provides a horizontal sector-shaped light beam having an angle greater than 180 degrees. The pair of level units 10 is disposed on the mounting base 20 in different oriented directions and together forms a horizontal light beam in a circumferential area to thereby perform level indication along multi directions simultaneously.

When the laser level 100 is in a working condition, the laser diode modules 1 of the two level units 10 emit the laser beam at the same. Since the working principle of the two level units is identical, for simplicity, only one of the level units 10 is detailedly described below.

Figure 6:
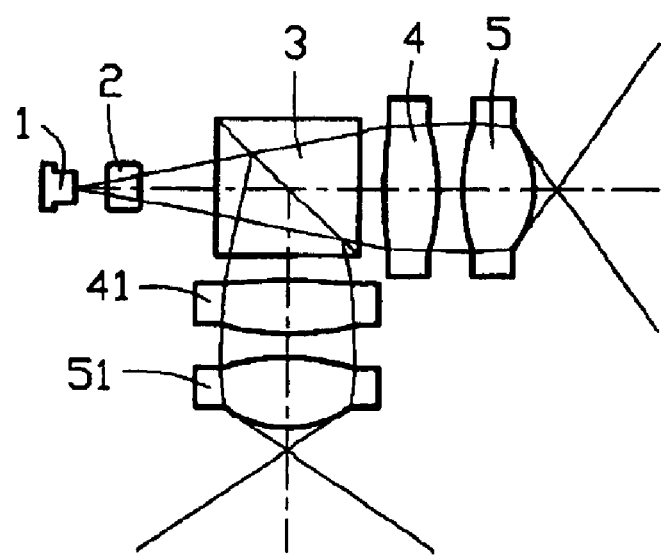
FIG. 6 is an optical diagram of the level unit.

Referring to FIG. 6, the laser beam emitted from the laser diode module 1 is spread to have a predetermined angle through the diverging lens 2 and then is directed to the beam splitter 3. The beam splitter 3 may be a conventional unit which transmits a portion of the laser beam providing a first light beam in the first direction and reflects a portion of the laser beam to provide a second light beam in the second direction perpendicular to the first direction. The first light beam further transmits to the first collimating lens 4 through the window 72 of the light-limited element 7 and is collimated to form a first horizontal band-shaped light beam having a certain thickness along a vertical direction. The first aspheric-cylindrical lens 5 finally disperses the first horizontal band-shaped light beam to form a first horizontal sector-shaped output beam having an angle greater than 90 degrees. In a preferred embodiment, the angle is approximately of 100 degrees. The thickness of the light beam is constant.

At the same time, the second light beam further transmits along the second direction and is dispersed through the window 72 of the light-limited element 7, the second collimating lens 41 and the second aspheric-cylindrical lens 51 to form a second horizontal sector-shaped output beam having an angle greater than 90 degrees. Because the two windows 72 are perpendicularly defined in the plates 71 of the light-limited element 7, the first and the second horizontal sector-shaped output beams are located in a same horizontal plane. The first and the second output beams together form a horizontal sector-shaped output beam having an angle greater than 180 degrees.

For the same principle, the other level unit 10 having an oriented direction different from the one level unit 10 also provides a horizontal sector-shaped output beam having an angle greater than 180 degrees. Due to suitable position between the two level units 10 and the mounting base 20, the two level units 10 together form a horizontal output beam in a circumferential area to thereby perform level indication along multi directions simultaneously.

It is understood that the present invention provides two level units 10 having the same structure wherein each level unit 10 generates a horizontal output beam having an angle greater than 180 degrees by using the beam splitter 3 and the two aspheric-cylindrical lenses 5, 51. Therefore, the two level units 10 together from a horizontal output beam in a circumferential area. It is appreciated that the laser level 100 of the present invention has a simplified structure since there is no moveable mechanism. Further, in use, the laser level 100 is neither subject to vibration nor required connection to an external source of power. It is also appreciated that the laser level 100 of the present invention is provided with two laser diode modules 1 for respectively providing a horizontal output beam having an angle greater than 180 degrees. Therefore, the output beam is intensive and thus is effective to cover a large working scope.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser level comprising:
   a pair of level units arranged side by side and disposed in different oriented directions, the pair of level units having substantially the same structure and each comprising:
   a laser light source adapted to emit a laser beam;
   a beam splitter adapted to simultaneously split the laser beam into first and second light beams along perpendicular first and second directions; and
   a first and a second aspheric-cylindrical lenses respectively arranged in the first and the second directions, the first and the second aspheric-cylindrical lenses having two optical axes respectively extending along the first and the second directions.

2. The laser level as claimed in claim 1, wherein the laser light source is a laser diode module.

3. The laser level as claimed in claim 2, wherein each level unit further comprises a diverging lens disposed between the laser light source and the beam splitter for spreading the laser beam.

4. The laser level as claimed in claim 1, wherein the beam splitter is a prism passing a portion of the laser beam to provide the first light beam in the first direction and reflecting a portion of the laser beam to provide the second light beam in the second direction.

5. The laser level as claimed in claim 1, wherein each level unit further comprises a light-limited element to restrict the position and the width of the light beams.

6. The laser level as claimed in claim 5, wherein the light-limited element comprises two perpendicular plates and defines two perpendicular windows respectively in the two plates.

7. The laser level as claimed in claim 6, wherein the light-limited element is disposed between the beam splitter and the first and the second aspheric-cylindrical lenses.

8. A laser level comprising:
  a pair of level units arranged in a side-by-side manner, each level unit comprising:
  a laser light source adapted to emit a laser beam;
  a beam splitter adapted to simultaneously split the laser beam into first and second light beams along perpendicular first and second directions;
  a light-limited element comprising two perpendicular plates respectively arranged in the first and the second directions, the light-limited element defining two perpendicular windows respectively in the two plates; and
  a first and a second aspheric-cylindrical lenses arranged in the first and the second directions, the first and the second aspheric-cylindrical lenses having two optical axes respectively extending along the first and the second directions.

9. The laser level as claimed in claim 8, wherein the laser light source is a laser diode module.

10. The laser level as claimed in claim 9, wherein each level unit further comprises a diverging lens disposed between the laser light source and the beam splitter for spreading the laser beam.

11. The laser level as claimed in claim 8, wherein the beam splitter is a prism passing a portion of the laser beam to provide the first light beam in the first direction and reflecting a portion of the laser beam to provide the second light beam in the second direction.

12. The laser level as claimed in claim 11, wherein each level unit further comprises a first and a second collimating lenses respectively disposed between the light-limited element and the first and the second aspheric-cylindrical lenses to collimate the first and the second light beams to respectively form a horizontal band-shaped light beam.

13. The laser level as claimed in claim 12, wherein the light-limited element is disposed between the beam splitter and the collimating lenses.

14. A laser level comprising:
  a mounting base defining a mounting face;
  a pair of level units disposed on the mounting face in different oriented directions, the pair of level units having substantially the same structure and each comprising:
  a laser light source adapted to emit a laser beam;
  a beam splitter adapted to split the laser beam into first and second light beams along first and second directions, simultaneously; and
  a first and a second devices respectively arranged in the first and the second directions, the first and the second light beams being respectively dispersed by the first and the second devices to form an output beam having an angle approximately of 180 degrees.

15. The laser level as claimed in claim 14, wherein the beam splitter is a prism passing a portion of the laser beam to provide the first light beam in the first direction and reflecting a portion of the laser beam to provide the second light beam in the second direction.

16. The laser level as claimed in claim 14, wherein each of the first and the second light beams is dispersed by a corresponding one of the first and the second devices to form a portion of the output beam having an angle approximately of 90 degrees.

17. The laser level as claimed in claim 16, wherein each of the first and the second devices is a aspheric-cylindrical lens.

18. The laser level as claimed in claim 14, wherein the laser light source is a laser diode module.

19. The laser level as claimed in claim 18, wherein each level unit further comprises a diverging lens disposed between the laser light source and the beam splitter for spreading the laser beam.

20. The laser level as claimed in claim 14, wherein each level unit further comprises a light-limited element disposed between the beam splitter and the first and second devices, the light-limited element being made of special material which can prevent the light beam from penetrating therethrough.

21. The laser level as claimed in claim 20, wherein the light-limited element comprises two plates at a predetermined angle and defines two windows respectively in the two plates.

22. The laser level as claimed in claim 21, wherein the two windows communicate with each other.

23. The laser level as claimed in claim 14, wherein each level unit further comprises an upper and a lower covers receiving the laser light source, the beam splitter and the first and the second devices therebetween.

* * * * *